H. M. WEBER.
MAKING SULFUR TRIOXID AND APPARATUS THEREFOR.
APPLICATION FILED FEB. 8, 1917.

1,366,439.

Patented Jan. 25, 1921.

WITNESSES:

Harry M. Weber
INVENTOR.
BY N. L. Foster
ATTORNEY

UNITED STATES PATENT OFFICE.

HARRY M. WEBER, OF EAST ORANGE, NEW JERSEY, ASSIGNOR TO ELLIS-FOSTER COMPANY, A CORPORATION OF NEW JERSEY.

MAKING SULFUR TRIOXID AND APPARATUS THEREFOR.

1,366,439.  Specification of Letters Patent.  Patented Jan. 25, 1921.

Application filed February 8, 1917. Serial No. 147,315.

*To all whom it may concern:*

Be it known that I, HARRY M. WEBER, a citizen of the United States, and a resident of East Orange, in the county of Essex and State of New Jersey, have invented certain new and useful Improvements in Making Sulfur Trioxid and Apparatus Therefor, of which the following is a specification.

The present invention is concerned with a method of producing sulfuric acid, particularly fuming sulfuric acid and to apparatus adapted for such operation.

The invention will be illustrated by reference to drawings showing forms of apparatus adapted for the purposes of the present invention.

In my process involving the exposure of sulfur dioxid and air or an oxygen-containing gas to a catalytic agent, I preferably make use of catalytic material of the character of tin or antimony chromate and the like such as is described in patents issued to Carleton Ellis and myself. Such catalytic material is of a character particularly suited for carrying out the present invention and in certain forms thereof apparently only a catalyzer of this character can be used advantageously, there evidently being some coöperative relation between this form of catalytic material and its arrangement or disposition in carrying out the conversion of sulfur dioxid to sulfur trioxid which renders such particular catalytic material an essential part of the organization thereof in at least these special cases.

Figure 1:
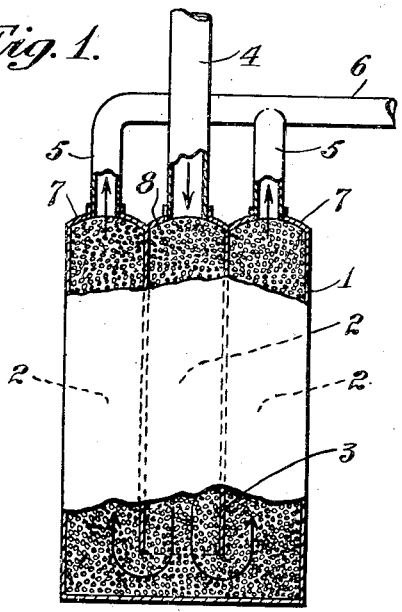
Figure 2:
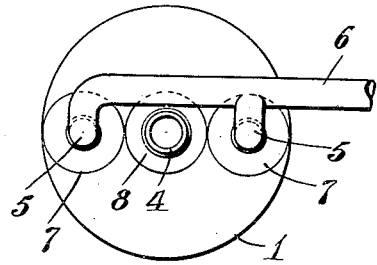
Figure 3:
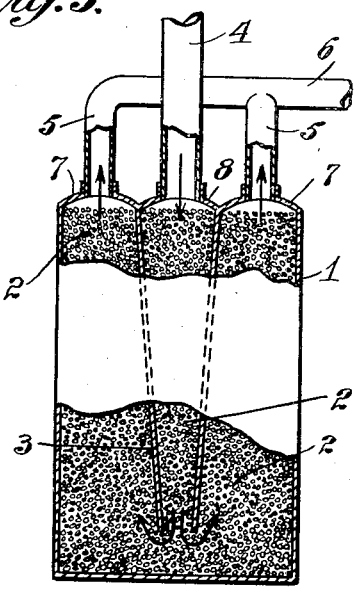
Figure 4:
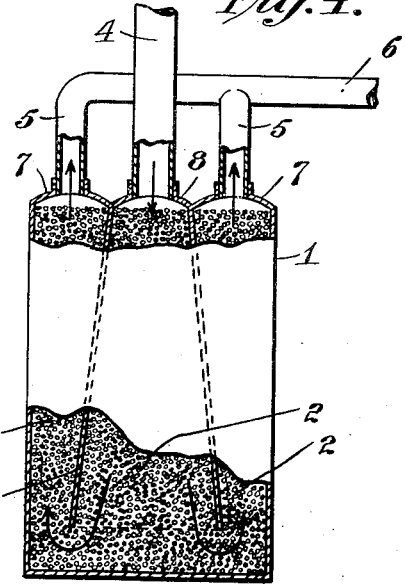

In the drawings Figure 1 represents a vertical section of one form of apparatus adapted for carrying out my invention and Fig. 2 shows a plan view thereof. Figs. 3 and 4 are vertical sections of other forms of apparatus which may be employed herein. The same numerals indicate the same parts throughout the various drawings.

In Fig. 1, a containing shell or receptacle is shown filled with a unitary mass of catalytic material 2, part of which is situated within the cylindrical inner part 3 and part in the outer annular space of said receptacle. 4 is an inlet pipe and 5 and 6 outlet pipes for the gaseous mixture. 7 and 8 are domes to which are attached the inlet and outlet pipes. In the operation of this apparatus the contact material is charged into the container until it is well filled and a mixture of sulfur dioxid and air containing from 2 or 3% of sulfur dioxid and upward to even as high as 10 or 12% or thereabout is passed in a somewhat heated state through the pipe 4 into the catalytic material, passing downwardly therethrough, then upwardly through the remainder of the unitary mass or layers of catalytic material, the converted gases passing away by the outlets 5 and 6. The catalytic material employed in this form of the apparatus is preferably granular, porous or spongy types of tin or antimony chromate which may be packed into the catalytic chamber in such a manner that the gases pass readily therethrough. The charge of catalytic material may be solidly packed, enough air space being formed by the granules to permit the flow of the gases therethrough, or the catalytic material may be placed on trays, shelves and the like and distributed through the catalytic chamber in that manner. It is preferable however, to have the catalytic material quite closely packed leaving as little room for air pockets and the like to give more effective catalytic action in a compact space.

The relative cross section of the inner and outer catalytic members or masses may be varied in a predetermined manner to accomplish a greater speed of travel in the inner layer so that the time of contact of the gases therein is less. In some cases, however, the reverse arrangement may be effected, namely; the area of cross section of the outer catalytic member is made smaller, whereby an increase of velocity of the gases therein is secured and a diminished time contact in the outer catalytic mass may be obtained. In a similar manner the relative depth of the inner and outer mass may be varied, the apparatus being preferably adjusted to compactly contain the catalytic masses in each case. In like manner the porosity of the masses may be varied, the inner member being given a greater porosity so as to give the effect of more rapid travel and in a similar manner, for other conditions, the outer member or mass may be rendered more pervious than the inner member so as to give the effect of a more rapid travel therethrough. Thus the apparatus enables the adjustment of the speed of travel of the gaseous current in contact with the catalytic material so that in a predetermined manner the velocity at any given portion of the catalytic mass is capable of adjustment to a definite speed compatible with the character of the catalytic material present at that point and to the nature of the gases which are being treated.

An important feature of the invention is therefore that of varying the cross section of the catalytic mass to secure zones wherein the gases are traveling at different velocity adjusted with respect to the particular stage of the reaction, degree of conversion of sulfur dioxid to sulfur trioxid and other factors.

In Figs. 3 and 4 the same organization of apparatus is largely maintained but the contact mass or inner member thereof is made conical, tapering from the top to the bottom, being narrower at the bottom so that as the gases travel downwardly through the catalytic mass the velocity increases and the time contact decreases. Emerging from the bottom thereof they pass through the outer layer of catalytic material and expand into a larger space with consequent retardation of flow giving greater time contact at that point. As the gases move upwardly there is an increase in velocity of flow. In Fig. 4 the reverse effect is secured. In both Figs. 3 and 4 the catalytic material may be charged in the form of granules, chunks or fragments, for example, just as coal is placed in a furnace, or the catalytic material may be disposed in the form of layers on shelves, trays or sieves and the like, according to the nature of such catalytic material, manner of operation and other circumstances which need not be here recited. The area of cross section of the inner member 3 may be varied in the apparatus shown in Figs. 1, 3 and 4 to adjust the flow of the gases to meet the peculiar conditions of the catalytic material being employed so as to secure the most effective time contact for any given stage of conversion. For example, if like forms of catalyzer are used throughout, then the time contact may be increased by enlarging the cross sectional area of 3, thus giving a longer period of contact for the gases during the period shortly after entering the receptacle.

One feature of operation which I aim to improve in the present case is that of overcoming the localized reaction and intense heating in some forms of contact apparatus, where for example, conversion of the sulfur dioxid may take place to the extent of 80 or 85% in the first few layers or first part of the contact mass resulting in an undue liberation of heat at that point and causing difficulties in operation, often requiring cooling of the contact apparatus by means of water jets or other devices to absorb the local excess of heat. It has been my observation that higher temperature than heretofore considered feasible of employment in the art are actually desirable under the preferred conditions of my process because they improve the velocity of reaction and give a large output per unit of apparatus without any essential sacrifice of efficiency, especially if the heat liberation is made more equable by the use of catalytic bodies such as tin chromate. Thus the dissociation point of sulfur trioxid may be advantageously exceeded and the reacting mass kept above this point during the latter part of, or even almost the entire period of exposure to the catalytic material. This is of importance particularly during the later stages so that the gaseous material gradually becomes hotter and may thus be caused to leave the converting chamber at a temperature above the dissociation point. I believe that such method of treatment is better adapted for my purposes, especially with catalyzers for which I have expressed a preference and I am even inclined to think that the production of a very high initial local temperature due to the heat of reaction causes sulfur trioxid, which has formed, to reform the dioxid resulting possibly in the production in part at least of a more stable form of dioxid which perhaps could be termed the passive state of this compound making it necessary to pass the charge through a very large mass of catalytic material to complete the conversion of the remaining relatively few per cent. of sulfur dioxid to the trioxid state. In the present process I preferably aim to avoid any such violent local internal heat with the possible formation of sulfur dioxid in the passive state and may use catalytic material of the nature of tin chromate which may be rendered progressively more active in more and more advanced zones of the contact mass or it may be placed in apparatus so shaped as to get differential velocities, such that by adjusting the time contact the gases may beneficially begin the reaction gradually, the temperature likewise gradually increasing. They may be withdrawn from the converter somewhat above the dissociation point of sulfur trioxid. Thus from comparatively small and compact units I may have a large yield of sulfur trioxid and good output due to increased velocity of reaction which is a feature of importance where compactness of apparatus and large daily yields are desired.

While I have particularly described the process in connection with catalyzers of the tin chromium type as I believe such apparatus is particularly fitted for use therefor and the process described is in part, in the specific and preferred form, based on the use of such catalytic material, I do not wish to be limited to the use of this catalytic material in such a way that others could use this method and apparatus with other forms of catalytic material and thus enjoy the advantages of my invention without recognizing my rights herein and to that end it may be stated that various other forms of catalyzer such as platinum on asbestos or on magnesium or sodium sulfate, iron and vanadium oxid, and various other species of catalytic material known in the art may be employed herein in their various physical and chemical forms.

While I have shown the current of gas and air entering by the pipe 4 it should be understood that such direction of the gases is not necessary as under some circumstances the flow of the gases may be reversed, the pipe 4 becoming the outlet. Thus instead of entering the converter and traveling downwardly in the center of the catalytic mass the gases may pass downwardly through the outer member and upwardly through the inner member. This method of treatment may be employed with rather fine granules of a catalyzer of the nature of antimony chromate. In this connection reference may be made to the fact that the granules of the catalytic material may be of different sizes in the mass so as to practically fill the voids but not sufficiently so as to obstruct the flow of the gases or these granules may be of uniformly fine size about like grains of buckwheat; or larger, as for example, the size of marbles, or even still larger, such as fragments of egg size. In some cases coarser catalyzer may be placed in the outer surface of the chamber and finer material located in the interior, thus throwing more of the gaseous current toward the outer edges of the container. In other cases this may be reversed, finer material being at the outer surfaces and coarse material in the center.

The outer walls of the contact chamber may be suitably lagged in whole or in part with heat insulating material to assist in suitably retaining the heat of reaction in carrying out the process of the present invention.

While I have shown the contact chamber of cylindrical shape I may use one which is square or rectangular, or other suitable shape according to circumstances, the inner member thereof being similarly shaped or otherwise as may be desired. In working with great masses of catalyzer, a plurality of the members 3 may be used as required for handling large bodies of gases.

In using sulfur dioxid of different concentrations in the gas mixture entering the converter, I preferably use modified forms of converter, depending on the proportion of the sulfur dioxid. For a mixture carrying three to six per cent. of sulfur dioxid I recommend the apparatus shown in Fig. 3. In mixtures running four to eight per cent. of sulfur dioxid, that shown in Fig. 1, while with concentrations of twelve per cent. or thereabout, the apparatus shown in Fig. 4 is desirable.

Another feature of my invention is the use of catalytic material of different strengths in different parts of the converter to assist in regulating the progress of the reaction and to enable the velocity thereof to take place at a suitable rate but still not so intense as to cause any undesirable localization of heat and excessively high temperature in some parts of the apparatus to the detriment of the operation throughout. Thus I may use a weaker form of catalyzer in the first stages of the conversion, passing to a mass of stronger capacity and then to a still stronger or if desired may progress from a mild catalyzer to a stronger form and then to a weaker form. The temperature of the gaseous mixture entering the converter may be regulated by passage through stoves so as to preheat to the desired degree to cause the reaction to begin promptly on entering the contact chamber. Thus a temperature of 375–425° C. and thereabout usually suffices for this purpose. In case sufficient heat is not developed in the converter or in that portion where it is particularly desired external heat may be applied if required, temporarily or permanently according to the conditions of operation.

A further feature of my invention which I regard as important is that of coating the interior of the metal container throughout with catalytic material which may be applied in the form of a paint or liquid coating and allowed to dry and bake on the surfaces thereof, forming a coating of $\frac{1}{8}$ to $\frac{1}{16}''$ thick. Thus the walls of the container become catalytic surfaces aiding in the conversion of the sulfur dioxid to the trioxid state. In Figs. 1, 3 and 4 the entire internal surfaces may be painted with a paint of tin chromate or other similar catalyzer or with a composition containing platinum and if catalytic material is disposed in the form of layers within said container any trays of metal or floors or screens supporting this material may be likewise painted with the catalytic paint. Thus the sulfur dioxid mixture from the time it enters the converter to the time it leaves comes in contact solely with catalytic material and is therefore not affected by any side reactions of an anticatalytic agent due to possible action of the container or to impurities in the metal of said container. Where the container is lined with fireproof material such as asbestos, brick or clay, etc., the catalyst may be applied thereto or incorporated therewith to an extent sufficient to considerably assist in the reaction.

One form of the apparatus which may be recommended is that of the type shown in

Fig. 1 which may have a plurality of inner shelves and these supports are painted either with catalytic paint containing tin chromate or platinum or other catalytic agent and the main catalytic mass is arranged in layers supporting these shelves or trays. The whole contact chamber throughout may be filled with such trays, which may be suitably spaced as desired.

An organization of process for carrying out my invention involving various operating stages which are correlated involves the burning of sulfur or sulfid products to produce a mixture of sulfur dioxid and air or oxygen-containing gas which is freed from dust by passing through dust chambers and through any suitable devices for eliminating final traces of dust such as scrubbers or washing devices of various sorts. The gas is dried and then without removing bodies which are poisonous to platinum including arsenic and the like, the gases may be passed through a preheater and then into a catalytic chamber where they come in contact with tin chromate and reaction takes place forming sulfur trioxid with evolution of heat causing the reaction to progress satisfactorily, under the conditions of the present invention and without serious detriment to the presence of what are normally considered catalyzer poisons.

My invention further comprises such an organization as is involved in the foregoing primarily directed to the catalytic conversion to a high percentage of yield of sulfur dioxid derived from arsenic or chlorin-containing material which quickly poison platinum material. The sulfur dioxid gas mixture may be simply freed from dust and cleaned to only partially remove those traces of "poisons" present affecting an ordinary platinum catalyzer. Thus a considerable saving of the cost of operation is secured. The dust removal should be sufficiently complete to avoid incrusting the catalytic material with a slag or coating of dust particles resulting from the gradual removal of dust from the gases in the contact chamber.

Another form of the apparatus involves the introduction of the gases at the bottom to produce an up draft followed by a downward path of travel or down draft member, the path of travel thus being reversed as compared with some of the modifications set forth above. This may be carried out by inverting the apparatus shown in Figs. 1, 3 and 4 and such specific forms as have been noted herein attaching to these figures in their normal upright condition may also apply to the inverted type. For example, Fig. 1 when inverted may have a capacious outer member and smaller inner member, or the outer member may be made more restricted and the inner member enlarged within wide limits. The outer member may carry granular fragmentary catalytic material loosely packed into the space between the outer wall of the contact chamber and the supporting shell of the inner member, while the latter may have the catalytic material disposed in the form of layers on asbestos cloths and the like. It is particularly recommended, in the latter structure, that the retaining wall of the inner member be well coated with catalytic paint or similar coating material employing catalytic material of high efficiency so as to get a powerful catalyzing action along these surfaces.

A catalytic receptacle of the character described containing two contiguous members may be termed a duplex chamber. Similarly a plurality of members would form a multiplex chamber.

The drawings do not show a preheater, which may however be formed of a coil of pipe in a suitable heating stove. In this the gases are preheated preferably to 375–425° C. as stated, a temperature around 400° C. being generally suitable.

What I claim is:—

1. In the herein described process the step which comprises adjusting the relative areas of cross section of the inner and outer catalytic members whereby a greater speed of travel of the gases is secured in the inner member.

2. In the herein described process the step which comprises adjusting the relative areas of cross section and porosity of the inner and outer catalytic members whereby a greater speed of travel of the gases is secured in the inner member.

3. In the herein described process the step which comprises adjusting the relative areas of cross section, depth and porosity of the inner and outer catalytic members of a single unitary catalytic mass whereby a greater speed of travel of the gases is secured in the outer member.

4. In the herein described process the step which comprises adjusting the relative areas of cross section and depth of the inner and outer catalytic members of a single unitary catalytic mass whereby a greater speed of travel of the gases is secured in the outer member.

5. In the herein described process the step which comprises adjusting the relative areas of cross section and porosity of the inner and outer catalytic members of a single unitary catalytic mass whereby a greater speed of travel of the gases is secured in the outer member.

6. In the herein described process the step which comprises adjusting the relative areas of cross section of the inner and outer catalytic members of a single unitary catalytic mass whereby a greater speed of travel of the gases is secured in the outer member.

7. The process of making sulfur trioxid from sulfur dioxid which comprises passing a mixture of air and sulfur dioxid downwardly through a column of catalytic material and then upwardly through a surrounding mass of catalytic material.

8. The process of manufacturing sulfur trioxid from sulfur dioxid and oxygen which comprises passing a current containing the raw gaseous materials into contact with a catalytic mass having zones of decreased porosity along the path of travel of the gaseous current and in adjusting the flow of the gases to effect in time contact with the catalytic material dependent upon the state of conversion at any given point.

9. In the process of making sulfuric acid by passing sulfur dioxid and air into contact with catalytic material within a chamber filled with a pervious mass of such catalytic material, the step which comprises conducting the operation in the presence solely of catalytic substances and without contact with metal or lining material of anti-catalytic or neutral character.

10. In the process of manufacturing sulfur trioxid from sulfur dioxid by contact of the latter admixed with air with catalytic material disposed in a mass of varying area of cross section, the step which comprises adjusting such area of cross section with respect to the proportion of sulfur dioxid in the incoming gas mixture passing through the catalytic mass and in proportioning such area of cross section with reference to the rate of conversion of the dioxid into the trioxid.

11. The process of making sulfur trioxid by passage of sulfur dioxid and air into contact with catalytic material which comprises preheating such a mixture of gases to a temperature approximately between 375–425° C., in passing such preheated mixture downwardly through a column of catalytic material and then upwardly through similar catalytic material disposed about said column, in permitting the heat of reaction to accumulate to cause a progressively increasing advance in temperature of the gases and in withdrawing the sulfur trioxid produced, said exposure of the sulfur dioxid to the catalytic agent being conducted in contact throughout with a relatively strong catalytic agent.

12. The process of making sulfur trioxid by passage of sulfur dioxid and air into contact with catalytic material which comprises preheating such a mixture of gases to a temperature approximately between 375–425° C., in passing such preheated mixture through a column of catalytic material, in permitting the heat of reaction to accumulate to cause a progressively increasing advance in temperature of the gases and in withdrawing the sulfur trioxid produced, said exposure of the sulfur dioxid to the catalytic agent being conducted in contact throughout with strong catalytic agent and without contact with iron chamber walls or refractory material of a relatively low catalytic power.

13. The process of making sulfur trioxid by passage of sulfur dioxid and air into contact with catalytic material which comprises preheating such a mixture of gases to a temperature approximately between 375–425° C., in passing such preheated mixture downwardly through a column of catalytic material and then upwardly through similar catalytic material disposed about said column, in permitting the heat of reaction to accumulate to cause a progressively increasing advance in temperature of the gases and in withdrawing the sulfur trioxid produced, said exposure of the sulfur dioxid to the catalytic agent being conducted in contact throughout with a relatively strong catalytic agent and without contact with iron chamber walls or refractory material of a relatively low catalytic power.

14. The process of making sulfur trioxid which consists in passing a preheated mixture of air and sulfur dioxid into a chamber charged with catalytic material and having the internal surfaces and supports of said chamber coated with a powerful catalytic agent.

15. In the process of making sulfur trioxid the step which comprises passing a mixture of sulfur dioxid and air into an elongated mass of catalytic material of gradually increasing area of cross section.

16. In the herein described process the step which comprises adjusting the relative areas of cross section and porosity of the inner and outer catalytic members of a single unitary catalytic mass whereby a greater speed of travel of the gases is secured in the outer member.

17. The process of manufacturing sulfur trioxid which comprises passing preheated sulfur dioxid and air through a unitary mass of granular catalytic material of varying cross section whereby the speed of travel of the gases in different portions of said catalytic mass is varied with respect to the stage of conversion at that point.

18. The process of making sulfur trioxid from sulfur dioxid which comprises the following series of steps, viz:—burning of sulfur-containing material to produce a sulfur dioxid and oxygen-containing gas mixture, substantially completely removing all the dust from said gas, in passing the gases through a preheater to raise the temperature thereof, and then through a mass of catalytic material, and in causing the heat of reaction to be well retained in the contact mass, whereby a gradual rise in temperature occurs in the passage of the gases through the catalytic chamber.

19. An apparatus adapted for the conversion of sulfur dioxid to sulfur trioxid which comprises a container carrying the catalytic mass disposed as a tapering inner and outer member substantially as described, an inlet to the inner member for the gas mixture and an outlet from the outer member for the exit of the converted gases.

20. An apparatus adapted to contain a unitary mass of catalytic material and means for producing zones of differing cross sectional area in different parts of said container, whereby the velocity of flow of gases is varied in different parts of said container.

21. An apparatus adapted for the conversion of sulfur dioxid into sulfur trioxid which comprises a container having an inner member adapted to carry catalytic material spaced away from the external walls of said container so as to form an annular outer member likewise adapted to contain catalytic material, means for causing a flow of gases through one member and through the other member, catalytic material in both the inner and outer members, the retaining wall of said inner member being coated with a catalytic composition.

22. An apparatus adapted for the conversion of sulfur dioxid into sulfur trioxid which comprises a container having an inner member adapted to carry catalytic material spaced away from the walls of said container so as to form an annular outer member likewise adapted to contain catalytic material, means for causing a flow of gases upwardly through the outer member and downwardly through the inner member, loosely packed granular catalytic material in the outer member and catalytic material in layers in the inner member.

23. An apparatus adapted for the conversion of sulfur dioxid into sulfur trioxid which comprises a container having an inner member adapted to carry catalytic material, spaced away from the walls of said container so as to form an annular outer member likewise adapted to contain catalytic material, means for causing a flow of gases upwardly through the outer member and downwardly through the inner member, loosely packed granular catalytic material in the outer member and catalytic material in layers in the inner member and the retaining wall of said inner member being well coated with a catalytic coating composition.

24. An apparatus adapted for the conversion of sulfur dioxid to sulfur trioxid which comprises a container, a unitary catalytic mass in layers contained therein, an outer catalytic member within the confines of said container and a plurality of inner members substantially as described.

25. An apparatus adapted for the conversion of sulfur dioxid to sulfur trioxid which comprises a preheater, a container, a catalytic mass contained therein, an outer catalytic member within the confines of said container and a plurality of inner members substantially as described.

26. An apparatus adapted for the conversion of sulfur dioxid to sulfur trioxid which comprises a container, a catalytic mass contained therein, an outer catalytic member within the confines of said container and a plurality of catalyzer-coated inner members all containing catalytic material substantially as described.

27. An apparatus adapted for the production of sulfur trioxid from sulfur dioxid which comprises a container adapted to hold a unitary mass of catalytic material and comprising an outer and inner member, the latter being smaller at one end than the other; whereby the velocity of flow of gases therein varies in proportion to the area of cross section of said member.

HARRY M. WEBER.